(12) United States Patent
Nakashima

(10) Patent No.: US 7,455,801 B2
(45) Date of Patent: Nov. 25, 2008

(54) METHOD OF PRODUCING FILM

(75) Inventor: Hiroshi Nakashima, Minami-Ashigara (JP)

(73) Assignee: Fujifilm Corporation, Tokyo (JP)

( * ) Notice: Subject to any disclaimer, the term of this patent is extended or adjusted under 35 U.S.C. 154(b) by 265 days.

(21) Appl. No.: 10/662,390

(22) Filed: Sep. 16, 2003

(65) Prior Publication Data
US 2004/0058093 A1    Mar. 25, 2004

(30) Foreign Application Priority Data
Sep. 17, 2002    (JP) .............................. 2002-269781

(51) Int. Cl.
*B29C 41/24* (2006.01)
*B29D 11/00* (2006.01)

(52) U.S. Cl. .................... 264/217; 264/1.34; 264/288.4; 264/290.2

(58) Field of Classification Search .................. 264/1.1, 264/1.34, 216, 217, 288.4, 290.2
See application file for complete search history.

(56) References Cited

U.S. PATENT DOCUMENTS 5,806,834 A * 9/1998 Yoshida ...................... 252/589

2003/0223026 A1* 12/2003 Morishima et al. ............ 349/117

FOREIGN PATENT DOCUMENTS

| JP | 04-286611 A | 10/1992 |
|---|---|---|
| JP | 08-142209 A | 6/1996 |
| JP | 11-048271 A | 2/1999 |

* cited by examiner

*Primary Examiner*—Mathieu D. Vargot
(74) *Attorney, Agent, or Firm*—Birch, Stewart, Kolasch & Birch, LLP

(57) ABSTRACT

The method of producing a film includes the steps of: casting a dope prepared by dissolving a macromolecular material in a solvent on a casting band; stripping the cast dope from the casting band to form a film; subjecting the stripped film to tentering to stretch or regulate the same in its width direction; and subjecting the tentered film to roll drying to dry the film while conveying the same in such a manner that it engages with a plurality of rolls, the method being characterized in that the solvent content in the film at the beginning of roll drying after tentering is kept within the range of 3 to 8% by weight, the surface temperature of the film during the roll drying is kept within the range of the film's Tg (glass transition temperature) −15° C. to the Tg, and the rate of the film expansion in the film conveying direction is kept within the range of −2% to 3%. Thus, the method enables both wrinkles and cast non-uniformity occurring on the film surface to be improved utilizing the tentering and roll drying steps of the conventional solvent casting method without any modifications, while avoiding the decrease in productivity.

15 Claims, 1 Drawing Sheet

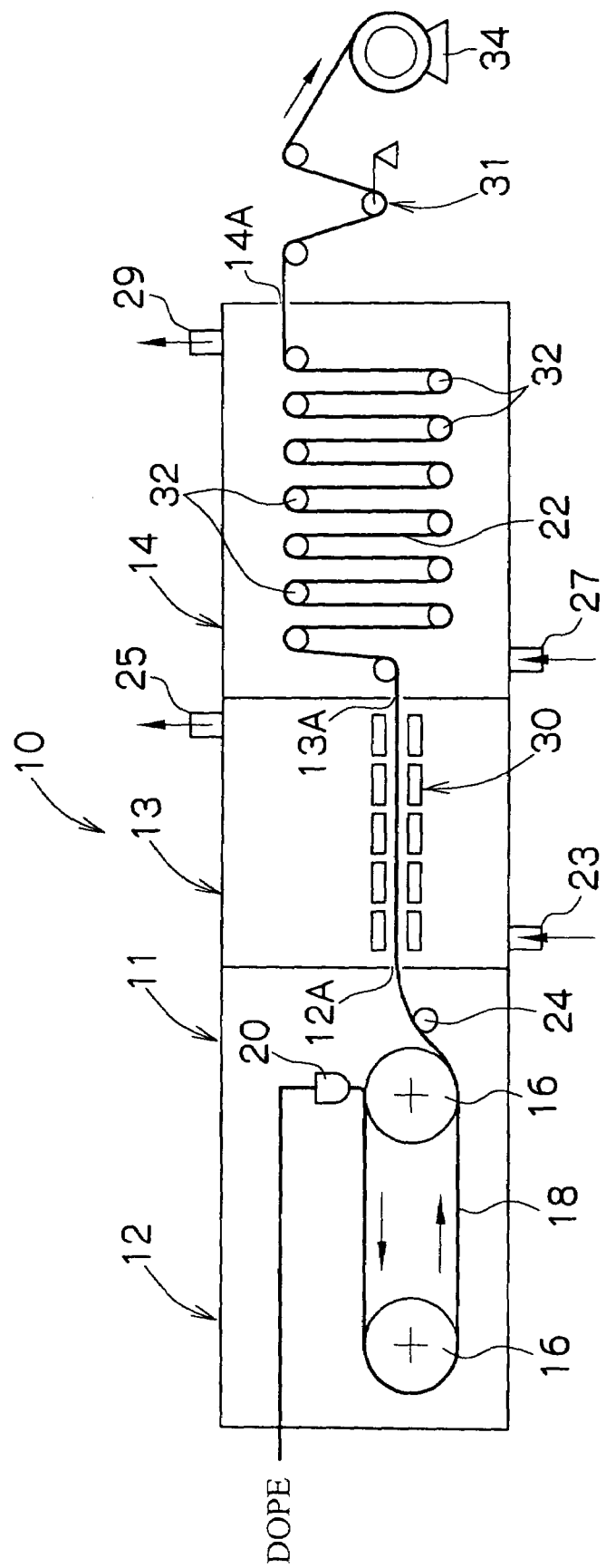

METHOD OF PRODUCING FILM

BACKGROUND OF THE INVENTION

This nonprovisional application claims priority under 35 U.S.C. § 119 (a) on patent application Ser. No. 2002-269781 filed in Japan on Sep. 17, 2002, which is herein incorporated by reference.

1. Field of the Invention

The present invention relates to a method of producing films, in particular, cellulose acylate films suitable for purposes such as a protective film for a sheet polarizer of a liquid crystal display (LCD), an optical compensating film, a color film, and a photographic material.

2. Description of the Related Art

Cellulose acylate films, in particular, a cellulose triacetate film (TAC film) has been used for purposes such as a protective film for a sheet polarizer of a liquid crystal display, an optical compensating film and a color film for the markets which have been growing in recent years, since it is excellent in optical isotropy.

Generally, cellulose acylate films are produced by solvent casting method; specifically, they are produced in the steps of: dissolving a polymer (a macromolecular material) in a solvent (mainly an organic solvent) to prepare a dope; casting the dope on a casting support such as a casting band or a casting drum; stripping the cast dope from the casting support to form a film; and drying the formed film. In the solvent casting method, however, small wrinkles can sometimes occur on the surface of a formed film due to the shrinkage of the film etc., and the occurrence of such wrinkles has been improved generally by conducting tentering, as a wrinkle preventive measure, for the film having been stripped from the casting support so that the film is stretched or regulated in its width direction.

When stripping the formed film from the casting support, it is difficult to apply stripping loads uniformly in the film's width direction, and the distribution and the variation in stripping loads are likely to cause non-uniformity in the stripping force. The variation in stripping force, which acts on the film, from part to part in turn creates a variation in the degree of stretching from part to part of the film, and this variation can sometimes cause a very small non-uniformity in thickness (hereinafter referred to as "cast non-uniformity") of the film having been stripped. This cast non-uniformity causes deterioration in smoothness and flatness of the film as a product, just as does the aforementioned wrinkles. For the cast non-uniformity, when the film thickness was large, its impact on the film's quality used not to be noticeable; however, in these days, films has become extremely thin, and even very small cast non-uniformity become tangible as deterioration in smoothness and flatness and its impact on the film's quality is large.

The causes of the distribution and variation in stripping loads, which are the factors causing cast non-uniformity, possibly have to do with deposits of the dope etc. depositing and accumulating on part of the casting support surface, non-uniformity in the drying state of the film on the casting support, non-uniformity in the temperature of the casting support itself, and non-uniformity in the concentration of the dope during the casting operation. Moreover, not only the above-described distribution and variation in stripping loads, but also non-uniformity in thickness of the casting film during the casting operation can sometimes remain as cast non-uniformity in the film having been stripped. The occurrence of cast non-uniformity causes the deterioration in appearance of the film, and in addition, it becomes tangible when a coating solution is applied to the film or when the film is laminated to a liquid crystal etc., causing product failures. In particular the films utilized for the optical purpose (e.g., for LCD), whose quality has been significantly enhanced in recent years, cast non-uniformity can be a fatal defect.

As a cast non-uniformity preventive measure, it is essential to improve the solvent casting method to eliminate the distribution and variation in stripping loads, which are the factors causing cast non-uniformity, or to eliminate the non-uniformity in thickness of the casting film during the casting operation. In actuality, however, these improvements also have a limitation. Thus, when the effectiveness of the improvements are not sufficient, the film production rate is decreased, as the ultimate measure, to increase the self-supporting properties of the dope on the casting support and then the dope is stripped from the casting support to form a film, so that casting non-uniformity is hard to produce. This, however, gives rise to another problem of decreasing the productivity.

There have been proposed techniques for improving the smoothness and the flatness of the film produced by the solvent casting method. For example, Japanese Patent Application Publication No. 8-142209 discloses a method of improving the flatness of thermoplastics films which includes: a roller heating step of conveying the thermoplastics film while heating with a far-infrared heater and a heating roller to flatten the film; and a roller cooling step subsequently after the roller heating step. This method, however, has the disadvantage of requiring the reconstruction of equipment for carrying out the solvent casting method. Since the method requires a roller heating step and a roller cooling step in the downstream of the solvent casting method, it cannot employ the tentering step and the roll drying step of the conventional solvent casting method without any modifications.

Japanese Patent Application Publication No. 4-286611 discloses a method of improving linear burrs (continuous wrinkles occurring in the film conveying direction during the conveying operation) on the surface of a cellulose triacetate film in which the cellulose triacetate film is conveyed in such a manner that it engages with rolls while keeping the amount of the solvent remaining in the film 10% or less in first and second drying chambers, keeping the surface temperature of the film in the same chambers lower than that of the film in the last chamber by 15° C. or more, and keeping the surface temperature of the film in the last chamber within the range of its glass transition temperature to the glass transition temperature +40° C. (i.e., 40° C. above the glass transition temperature). This method is to perform high-temperature and high-speed drying while maintaining the flatness of the film, but not eliminate the cast non-uniformity occurring in the film.

Japanese Patent Application Publication No. 11-48271 discloses a method to dry a web stripped from a casting surface while stretching the same with a tentering machine in the environment that meets the requirement: the solvent content in the film of less than 50% by weight and 12% by weight or more. This method has the effect of eliminating the wrinkles having occurred on the film surface and the cast non-uniformity having occurred in the film conveying direction; however, since the cast non-uniformity is formed in a variety of directions, including the film conveying direction and film width direction, the cast non-uniformity formed in the directions other than the film conveying direction is rather fixed by the tentering and thereby is difficult to rectify in a later step.

Thus, in actuality, if the prior art, which is to improve the smoothness and the flatness of films produced by the solvent casting method, is applied to the improvement of cast non-uniformity without any modifications, sufficient effect cannot be produced.

SUMMARY OF THE INVENTION

With these backgrounds, there have been demands for a method of producing a film which can utilize the tentering step and the roll drying step of the conventional solvent casting method without any modifications, and moreover, improve both wrinkles and cast non-uniformity (a very small non-uniformity in thickness) occurring on the film surface effectively.

The present invention has been made in the light of the above-described problems; accordingly, the object of the invention is to provide a method of producing a film which can utilize the tentering step and the roll drying step of the conventional solvent casting method without any modifications to improve both wrinkles and cast non-uniformity occurring on the film surface effectively while avoiding the decrease in productivity.

After examining the improvement of cast non-uniformity which may occur on the surface of a formed film, the present inventor found the following things. Specifically, cast non-uniformity can be improved by roll drying in which rolls and the film surface are brought into physical contact with each other, since cast non-uniformity is very small non-uniformity in thickness; however, if the solvent content (wet base % by weight) in the film during roll drying subsequently after tentering, in other words, the solvent content (wet base % by weight) at the end of the tentering is not specified, the effect of improving the conditions of the film surface, which the tentering fundamentally has, is decreased, which in turn not only decreases the effect of improving wrinkles occurring on the surface of the film, but also rather fix part of the cast non-uniformity by the tentering. Accordingly, even if the roll drying is carried out after the tentering under suitable conditions, the effect of improving cast non-uniformity is not produced. The present inventor also found that, when considering the effect of improving cast non-uniformity alone, it is effective to raise the surface temperature of the film and increase the rate of film expansion in the film conveying direction, but on the other hand, to do so produces the adverse effects of causing new wrinkles and deterioration such as retardation of optical properties and retardation of surface orientation (Re, Rth).

The present invention has been made based on such findings and is made up of concrete idea how to improve cast non-uniformity effectively using the roll drying while avoiding the adverse effects on the improvement of the surface conditions which the tentering fundamentally provides.

In order to attain the above-described object, the present invention is directed to a method of producing a film, comprising the steps of: casting a dope prepared by dissolving a macromolecular material in a solvent on a casting support; stripping the cast dope from the casting support to form a film; subjecting the stripped film to tentering to stretch or regulate the same in its width direction; and subjecting the tentered film to roll drying to dry the film while conveying the same in such a manner that it engages with a plurality of rolls, the method being characterized in that the solvent content (wet base % by weight) in the film at the beginning of the roll drying after the tentering is kept within the range of 3 to 8 wet base % by weight (3 wet base % by weight or more and 8 wet base % by weight or less), the surface temperature of the film during the roll drying is kept within the range of the film's Tg (glass transition temperature) −15° C. (15° C. below the Tg) to the Tg, and the rate of the film expansion in the film conveying direction is kept within the range of −2% to 3% (−2% or more and 3% or less).

According to the present invention, specifying the solvent content (wet base % by weight) in the film at the beginning of the roll drying after the tentering makes it possible not only to produce the effect of improving the conditions of the film surface while avoiding the fixation of the cast non-uniformity by the tentering, but also to produce the effect of improving the cast non-uniformity during the roll drying. Furthermore, specifying the surface temperature of the film during the roll drying so that it is kept within the range of the film's Tg (glass transition temperature) −15° C. to the Tg and specifying the rate of the film expansion in the film conveying direction so that it is kept within the range of −2% to 3% enable the improvement of cast non-uniformity while avoiding the occurrence of new wrinkles and the deterioration of optical properties (Re, Rth).

Thus, both wrinkles and cast non-uniformity, which may occur on the film surface, can be improved utilizing the tentering and roll drying steps of the conventional solvent casting method without any modifications while avoiding the decrease in productivity.

Preferably, the film is subjected to the roll drying in such a manner that the film engages with at least 10 or more rolls. This allows the film to be in contact with the rolls for longer duration, and hence more effective improvement of the cast non-uniformity.

Preferably, the length of the film's stay in the zone where the roll drying is carried out is 1 minute or more. This enables more effective improvement of the cast non-uniformity.

For example, the macromolecular material is cellulose acylate. The present invention, which can eliminate both wrinkles and cast non-uniformity occurring on the film effectively, is particularly effective in a cellulose acylate film suitably used for the purposes such as a protective film for a sheet polarizer of a liquid crystal display, an optical compensating film, a color film, and a photographic material.

The present invention is also directed to a sheet polarizer and a film for liquid crystal display using a film produced by the above-described method. The film produced by the method of the present invention is most suitable as a sheet polarizer or a film for LCD.

BRIEF DESCRIPTION OF THE DRAWING

The nature of this invention, as well as other objects and advantages thereof, will be explained in the following with reference to the accompanying single drawing, which is a schematic view showing a film production apparatus to which a method of producing a film of the present invention is applied.

DETAILED DESCRIPTION OF THE PREFERRED EMBODIMENTS

In the following preferred embodiments of the method of producing a film of the present invention will be described with reference to the accompanying drawing.

The single drawing is a schematic view showing a film production apparatus 10 to which the method of producing a film of the present invention is applied.

As shown in the drawing, the film production apparatus 10 is made up of a band zone 12, a tentering zone 13 and a roll drying zone 14, and a film 22 having been treated in the roll drying zone 14 is wound into a winding machine 34. Each of the zones 12, 13 and 14 is zoned by a casing 11 including passage holes 12A, 13A and 14A which the film 22 passes through.

The band zone 12 is provided with a pair of support rollers 16, 16, a casting band (corresponding to a casting support) 18, and a casting die 20. At least one of the pair of support rollers 16, 16 is connected to a drive (not shown). The casting band 18 is formed of a stainless sheet as an endless band and engaged with the pair of support rollers 16, 16. Accordingly, if the support rollers 16, 16 are rotatively driven, the casting band 18 is allowed to revolvingly travel between the support rollers 16, 16.

The casting die 20 is provided above the casting band 18 and supplied with a dope which is prepared by dissolving a cellulose acylate in an organic solvent. The dope is prepared by dissolving a cellulose acylate, along with, for example, a plasticizer, a UV absorber, a lubricant and other additives, in a solvent and cast from the casting die 20 on the casting band 18 in such a manner that it has a uniform thickness. The cast dope is conveyed together with the casting band 18, and during the conveyance, the organic solvent evaporates from the surface opposite to the casting band 18 (hereinafter referred to as air surface). Once provided with self-supporting properties, the dope is stripped from the casting band 18 by a strip roll 24 to form a film 22. Although the casting band 18 is used as a casting support in the above description, a casting drum (not shown) may also be used as a casting support. Specifically, the dope may be cast on the surface of a casting drum, while rotating the same, whose surface has been made smooth by chromium plating etc.

The stripped film 22 is first introduced into the tentering zone 13 and its lateral edge portions are held with clips or pins of a tenter 30. The tentering zone 13 is supplied with air through an air supplying opening 23 and the air containing the volatilized solvent is discharged through an air discharging opening 25. Thus, the film 22 is dried while it is conveyed with its end portions held by the tenter 30 so that it is stretched or regulated in its width direction.

The film 22 having been subjected to tentering in the tentering zone 13 is then fed to the roll drying zone 14. Between the passage hole 13A on the inlet side of the roll drying zone 14 and the passage hole 14A on the outlet side of the same, 10 or more rolls 32, 32, . . . are arranged in staggered fashion, and the film 22 is engaged with these rolls 32. The film 22 is dried while it is conveyed in such a manner that it is bought into contact with a plurality of rolls 32. In this case, the solvent content in the film 22 at the beginning of the roll drying after the tentering is regulated so that it falls in the range of 3 to 8 wet base % by weight. In order to specify the solvent content in the film 22 so that it falls in the above range, the drying rate is adjusted by controlling the temperature and the amount of the air flow fed into the tentering zone 13 and the amount of the discharging air flow discharged from the tentering zone 13.

Into the roll drying zone 14, hot air is fed through a hot air feeding opening 27, and hot air containing the solvent volatilized from the film 22 is discharged through an air discharging opening 29. The temperature of the hot air fed into the roll drying zone 14 is controlled to specify the surface temperature of the film 22 during roll drying so that it falls in the range of the film's Tg (glass transition temperature) $-15°$ C. (i.e., $15°$ C. below the Tg) to the Tg. And the rate of expansion of the film 22 in its conveying direction is specified so that it falls in the range of $-2\%$ to $3\%$. In order to specify the expansion rate of the film 22 so that it falls in the above range, the conveying tension is adjusted with a dancer roller 31 provided between the roll drying zone 14 and the winding machine 34.

Then a method of producing a film, which uses a film production apparatus constructed as above, will be described.

Once a dope is cast on the casting band 18, the organic solvent in the cast dope evaporates from the air surface of a film 22. This allows the film of the dope having been cast on the casting band 18 to have self-supporting properties, and the film of the dope in such a state is stripped from the casting band 18 to form the film 22. The stripped film 22 is subjected to tentering in the tentering zone 13 and then to roll drying in the roll drying zone 14. In this case, it is important to regulate the solvent content in the film at the beginning of the roll drying after the tentering so that it falls in the range of 3 to 8 wet base % by weight, preferably 4 to 7 wet base % by weight. The reason for this is that if the solvent content in the film is as high as more than 8 wet base % by weight at the beginning of roll drying, in other words, if the solvent content (wet base % by weight) in the film during tentering is too high, the tentering effect of improving the surface conditions of the film is decreased, leading to decrease in the effect of improving the wrinkles having occurred on the film surface, and moreover, part of the cast non-uniformity is rather fixed because of the film's having passed through the tentering zone. Specifically, of a variety of cast non-uniformity, the cast non-uniformity in the film conveying direction is improved to some extent by tentering, whereas the cast non-uniformity in the film width direction is not improved, but rather fixed. Conversely, if the solvent content in the film is as low as less than 3 wet base % by weight at the beginning of roll drying, the effect of improving cast non-uniformity in the roll drying zone 14 is decreased.

To increase the effect of improving cast non-uniformity while avoiding the occurrence of new wrinkles and the deterioration of the optical properties (Re, Rth) during the roll drying, it is important to specify the surface temperature of the film so that it falls in the range of the film's Tg (glass transition temperature) $-15°$ C. to the Tg and the rate of the expansion of the film in its conveying direction so that it falls in the range of $-2\%$ to $3\%$. The reason of this is that if the surface temperature of the film during roll drying is as low as less than Tg $-15°$ C., the effect of improving cast non-uniformity is decreased, whereas if the surface temperature of the film is as high as more than Tg, the plasticizer in the film is apt to scatter, and the scattering plasticizer attaches to the film, which is likely to cause external faults. To increase the effect of improving cast non-uniformity, the rate of expansion of the film in its conveying direction should be increased; however, if the rate is increased to as high as more than $3\%$, new wrinkles are likely to occur due to the increased expansion rate, and moreover, the optical properties (Re, Rth), which are critical factors that determine the quality of the film as an optical film, are likely to deteriorate. The number of the rolls in the roll drying zone 14 is preferably 10 or more. The reason for this is that in the environment that meets the above-mentioned drying requirements (the solvent content (wet base % by weight) in the film at the beginning of drying, the surface temperature of the film during drying, and the rate of expansion of the film), cast non-uniformity is improved by the physical contact of the film surface with rolls; therefore, it is preferable to bring the film into contact with 10 or more rolls. Further, the film 22 is preferably allowed to stay in the roll drying zone the meets the roll drying requirements for 1 minutes or longer.

The film having been subjected to the roll drying in the roll drying zone 14 is wound into the winding machine. As a result, the film free from both wrinkles and cast non-uniformity and superior in smoothness and flatness can be produced without decreasing the film production rate. Thus, the film produced by this film production method is most suitable as a sheet polarizer or a film for LCD.

The macromolecular materials used in the present invention are not limited to any specific ones; however, preferably cellulose esters are used. Of the cellulose esters, cellulose acylates are preferably used, and cellulose acetates are particularly preferably used. Of the cellulose acetates, cellulose triacetate (TAC), whose average acetate group substitution degree is 57.5 to 62.5% (substitution degree: 2.6 to 3.0), is most preferably used. The term "acetate group substitution degree" herein used means the amount of acetic acid, per unit weight of cellulose, bound to the cellulose chain. The acetate group substitution degree is obtained in accordance with the measurement and calculation of acetylation degree stipulated in ASTM: D-817-91 (Test Methods for Cellulose Acetate etc.).

As for the solvent used in the present invention, both chlorine-based and non-chlorine-based organic solvents can be used as a prime solvent; however, from the environmental viewpoint, it is preferable to use a non-chlorine-based organic solvent as a prime solvent.

Chlorine-based organic solvents generally mean halogenated hydrocarbon compounds, and typical examples are, not limited to, dichloromethane (methylene chloride) and chloroform. Examples of non-chlorine-based organic solvents are, not limited to, esters, ketones, ethers and alcohols. The solvent used is not particularly limited as long as its purity is equivalent to that of commercially available solvent. The solvent may be used independently (100% by weight) or in the form of a mixture with esters, ketones, ethers or alcohols having 1 to 6 carbon atoms. Concrete examples of applicable solvents are esters (e.g. methyl acetate, methyl formate, ethyl acetate, amyl acetate and butyl acetate), ketones (e.g. acetone, methyl ethyl ketone and cyclohexanone), ethers (e.g. dioxane, dioxolane, tetrahydrofuran, diethyl ether and methyl-t-butyl ether), and alcohols (e.g. methanol, ethanol and butanol). As the organic solvent, the mixture of the above-mentioned chlorine-based organic solvents and non-chlorine-based organic solvents can also be used.

As the plasticizer added to the dope of the present invention, can be used phosphoric esters (e.g. triphenyl phosphate (hereinafter referred to as TPP), tricresyl phosphate, cresyl diphenyl phosphate, octyl diphenyl phosphate and diphenyl biphenyl phosphate (hereinafter referred to as BDP), trioctyl phosphate and tributyl phosphate), phthalic esters (e.g. diethyl phthalate, dimethoxyethyl phthalate, dimethyl phthalate and dioctyl phthalate), glycol esters (e.g. triacetin, tributylin, butyl phthalyl butyl glycolate, ethyl phthalyl ethyl glycolate, methyl phthalyl ethyl glycolate and butyl phthalyl butyl glycolate), and others.

As the ultraviolet absorber, can be used oxybenzophenone compounds, benzotriazole compounds, salicylate ester compounds, benzophenone compounds, cyanoacrylate compounds, nickel acetate compounds and others. Particularly preferable ultraviolet absorbers are benzotriazole compounds and benzophenone compounds.

EXAMPLES

In the following examples of the film production methods of the present invention will be described.

A dope was prepared by adding triphenyl phosphate (TPP), as a plasticizer, to a solution of cellulose triacetate in a solvent. The dope was cast on a casting band, the cast dope was stripped from the casting band to form a film, and the stripped film was subjected to tentering and then to roll drying, to produce a film 80 μm thick.

Examples 1 to 7 were so constructed as to meet all the requirements of the present invention: the solvent content (wet base % by weight) in the film at the beginning of the roll drying (hereinafter referred to as "solvent content in the film"), the temperature of the film surface during the roll drying (hereinafter referred to as "temperature of the film surface"), and the rate of the film expansion in the film conveying direction during the roll drying (hereinafter referred to as "rate of the film expansion").

Comparative example 1 was so constructed that the solvent content (wet base % by weight) in the film deviated from the lower limit, 3% by weight, of the present invention. Comparative example 2 was so constructed that the solvent content (wet base % by weight) in the film deviated from the upper limit, 7% by weight, of the present invention. Comparative example 3 was so constructed that the temperature of the film surface deviated from the lower limit, Tg −15° C., of the present invention. Comparative example 4 was so constructed that the temperature of the film surface deviated from the upper limit, Tg° C., of the present invention. Comparative example 5 was so constructed that the rate of the film expansion deviated from the upper limit, +3%, of the present invention. Comparative example 6 was so constructed that the rate of the film expansion deviated from the lower limit, −2%, of the present invention.

The length of the film's stay in the roll drying zone was set to 1 or 2 minutes and the number of the rolls in the roll drying zone was set to 10 or 20, so as to meet the preferred requirements of the present invention. The glass transition temperature was measured with a TMA (thermomechanical analyzer). In the rate of the film expansion in the film conveying direction, plus (+) means the expansion of the film, whereas minus (−) means the contraction of the film.

Comparison was made between the films produced so as to meet the requirements of the examples and those produced so as to meet the requirements of the comparative examples for the improved conditions of their cast non-uniformity, their optical properties, and other defects remaining on them. The results of the comparison are shown in Table 1.

TABLE 1

|  | Solvent Content in Film at the beginning of Roll Drying (wet base % by weight) | Temperature of Film Surface during Roll Drying (° C.) | Rate of Film Expansion during Roll Drying (%) | Length of Film's Stay in Roll Drying Zone (min) | Number of Rolls in Roll Drying Zone | Improved Conditions of Cast Non-uniformity | Optical Properties of Film | Other Defects on Film |
|---|---|---|---|---|---|---|---|---|
| Comparative Example 1 | 2 | Tg | +0.5 | 2 | 20 | C | B |  |
| Example 1 | 3 | Tg | +0.5 | 2 | 20 | B | B |  |

TABLE 1-continued

|  | Solvent Content in Film at the beginning of Roll Drying (wet base % by weight) | Temperature of Film Surface during Roll Drying (° C.) | Rate of Film Expansion during Roll Drying (%) | Length of Film's Stay in Roll Drying Zone (min) | Number of Rolls in Roll Drying Zone | Improved Conditions of Cast Non-uniformity | Optical Properties of Film | Other Defects on Film |
|---|---|---|---|---|---|---|---|---|
| Example 2 | 6 | Tg | +0.5 | 2 | 20 | A | B |  |
| Comparative Example 2 | 8 | Tg | +0.5 | 2 | 20 | A | B | Faint and fine lines |
| Example 3 | 6 | Tg − 10 | +0.5 | 2 | 20 | A | B |  |
| Example 4 | 6 | Tg − 15 | +0.5 | 2 | 20 | B | B |  |
| Comparative Example 3 | 6 | Tg − 20 | +0.5 | 2 | 20 | F | B |  |
| Comparative Example 4 | 6 | Tg + 10 | +0.5 | 2 | 20 | A | B | Linear burrs |
| Example 5 | 6 | Tg | −2 | 2 | 20 | B | B |  |
| Example 6 | 6 | Tg | +3 | 2 | 20 | A | B |  |
| Comparative Example 5 | 6 | Tg | +4 | 2 | 20 | A | F | Linear wrinkles |
| Example 7 | 6 | Tg | +0.5 | 1 | 10 | B | B |  |
| Comparative Example 6 | 6 | Tg | −3 | 1 | 20 | F | B |  |

In the evaluation, cast non-uniformity was evaluated using four ranking: A—no visible cast non-uniformity; B—almost no visible cast non-uniformity; C—sporadic visible cast non-uniformity; and F—continuous visible cast non-uniformity. The films ranked A and B were considered as "acceptable films". The optical properties of films were evaluated by the change in Re. When the change was within ±10% of the standard value of Re, the films were ranked B and considered as "acceptable films". The films that did not meet the above optical property requirement were ranked F and considered as "non-acceptable films".

As can be seen from Table 1, the films of examples 1 to 7 were acceptable in both cast non-uniformity and optical properties and had neither visible wrinkles (lines and linear burrs) nor other defects on their surface.

On the other hand, the film of comparative example 1 was ranked C in cast non-uniformity. This is possibly because the solvent content (wet base % by weight) in the film was too low to produce a satisfactory effect of improving the cast non-uniformity during the roll drying. The film of comparative example 2 was acceptable in both cast non-uniformity and optical properties; however, it had visible faint and fine lines on its surface. This is possibly because the solvent content (wet base % by weight) in the film was so high that the tentering effect of improving the surface conditions was decreased and thereby a satisfactory wrinkle eliminating action was not achieved. The film of comparative example 3 was ranked F in cast non-uniformity. This is possibly because the temperature of the film surface was so low that the roll drying effect of improving the cast non-uniformity was decreased. The film of comparative example 4 was acceptable in both cast non-uniformity and optical properties; however, it had visible linear burrs on its surface. This is possibly because the temperature of the film surface was so high that new wrinkles were produced during the roll drying. The film of comparative example 5 was ranked F in optical properties. This is possibly because the rate of film expansion was so high that the change in Re became large. The film of comparative example 6 was ranked F in cast non-uniformity. This is possibly because the rate of film expansion was so low that the roll drying effect of improving the cast non-uniformity was decreased.

As described above, films superior in smoothness and flatness can be produced when they are so produced as to meet all the requirements: the solvent content in the film at the beginning of the roll drying; the temperature of film surface during the roll drying; and the rate of film expansion during the roll drying.

Table 2 shows the results of examining the effect of the number of rolls used in the roll drying zone.

TABLE 2

|  | Solvent Content in Film at the beginning of Roll Drying (wet base % by weight) | Temperature of Film Surface during Roll Drying (° C.) | Rate of Film Expansion during Roll Drying (%) | Length of Film's Stay in Roll Drying Zone (min) | Number of Rolls in Roll Drying Zone | Improved Conditions of Cast Non-uniformity | Optical Properties of Film |
|---|---|---|---|---|---|---|---|
| A | 6 | Tg | +0.5 | 1 | 20 | A | B |
| B | 6 | Tg | +0.5 | 1 | 10 | B | B |
| C | 6 | Tg | +0.5 | 1 | 7 | C | B |

Films were so produced as to meet the same requirements as above, while changing the number of rolls used: 20, 10 and 7. The results show that the larger the number of rolls become, the more effectively the cast non-uniformity is improved. Further, when the number of rolls is 7, which is less than the number 10, as the preferred requirement of the present invention, the film had visible linear wrinkles on its surface.

As described so far, according to the method of producing a film of the present invention, both wrinkles and cast non-uniformity, which may occur on the film surface, can be improved utilizing the tentering and roll drying steps of the conventional solvent casting method without any modifications while avoiding the decrease in productivity.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method of producing a cellulose film, comprising the steps of:
   casting a dope prepared by dissolving a macromolecular material in a solvent on a casting support;
   stripping the cast dope from the casting support to form a film;
   subjecting the stripped film to tentering to stretch or regulate the film in a width direction of the film; while drying the tentered film to a solvent content in the film within a range of 3 to 8 wet base % by weight; and
   subjecting the tentered film to roll drying to dry the film at one temperature range while conveying the film in such a manner that the film engages with a plurality of rolls, wherein a surface temperature of the film during the roll drying is kept within said one temperature range, wherein said temperature range is Tg (glass transition temperature) of the film −15° C. to the Tg, and a rate of expansion of the film in a conveying direction of the film is kept within a range of −2% to 3%.

2. The method as defined in claim 1, wherein the film is subjected to the roll drying in such a manner that the film engages with at least 10 or more rolls.

3. The method as defined in claim 1, wherein a length of stay of the film in a zone where the roll drying is carried out is 1 minute or more.

4. The method as defined in claim 1, wherein the macromolecular material is cellulose acylate.

5. The method as defined in claim 1, wherein the solvent content in the film at beginning of the roll drying after the tentering is 4 to 7 wet base % by weight.

6. The method as defined in claim 1, wherein the macromolecular material is cellulose acetate.

7. The method as defined in claim 1, wherein the macromolecular material is cellulose triacetate having an acetate group substitution degree of 57.5 to 62.5%.

8. The method as defined in claim 1, wherein the solvent contains a chlorine-based solvent or a non-chlorine-based solvent as a prime solvent.

9. The method as defined in claim 8, wherein the chlorine-based solvent is dichloromethane or chloroform.

10. The method as defined in claim 8, wherein the non-chlorine-based solvent is at least one selected from the group consisting of methyl acetate, methyl formate, ethyl acetate, amyl acetate and butyl acetate, acetone, methyl ethyl ketone, cyclohexanone, dioxane, dioxolane, tetrahydrofuran, diethyl ether and methyl-t-butyl ether, methanol, ethanol and butanol.

11. The method as defined in claim 1, wherein the dope further contains at least one plasticizer selected from the group consisting of triphenyl phosphate, tricresyl phosphate, cresyl diphenyl phosphate, octyl diphenyl phosphate and diphenyl biphenyl phosphate, trioctyl phosphate and tributyl phosphate, diethyl phthalate, dimethoxyethyl phthalate, dimethyl phthalate and dioctyl phthalate, triacetin, tributylin, butyl phthalyl butyl glycolate, ethyl phthalyl ethyl glycolate, methyl phthalyl ethyl glycolate and butyl phthalyl butyl glycolate.

12. The method as defined in claim 1, wherein the dope further contains a benzotriazole or benzophenone ultraviolet absorber.

13. A method of producing a cellulose film, comprising the steps of:
   casting a dope prepared by dissolving a macromolecular material in a solvent on a casting support;
   stripping the cast dope from the casting support to form a film;
   subjecting the stripped film to tentering to stretch or regulate the film in a width direction of the film; while drying the tentered film to a solvent content in the film within a range of 3 to 8 wet base % by weight; and
   subjecting the tentered film to roll drying in a single drying zone to dry the film at one temperature range while conveying the film in such a manner that the film engages with a plurality of rolls, wherein a surface temperature of the film during the roll drying is kept within said one temperature range, wherein said temperature range is Tg (glass transition temperature) of the film −15° C. to the Tg, and a rate of expansion of the film in a conveying direction of the film is kept within a range of −2% to 3%.

14. The method as defined in claim 13, wherein the film engages with at least 10 or more rolls during roll drying.

15. The method as defined in claim 13, wherein the film is subjected to roll drying in said single drying zone for a period of at least 1 minute.

* * * * *